(12) United States Patent
Spinelli

(10) Patent No.: US 7,689,328 B2
(45) Date of Patent: Mar. 30, 2010

(54) DETERMINING SUITABLE AREAS FOR OFF-AIRPORT LANDINGS

(75) Inventor: Charles B. Spinelli, Bainbridge Island, WA (US)

(73) Assignee: Boeing Company, Chicago, IL (US)

( * ) Notice: Subject to any disclaimer, the term of this patent is extended or adjusted under 35 U.S.C. 154(b) by 314 days.

(21) Appl. No.: 11/643,061

(22) Filed: Dec. 21, 2006

(65) Prior Publication Data
US 2008/0154447 A1 Jun. 26, 2008

(51) Int. Cl.
*G05D 1/08* (2006.01)
(52) U.S. Cl. .................. 701/7; 701/13; 701/16; 701/209; 340/945; 340/947
(58) Field of Classification Search ............ 701/5, 701/7, 13, 16, 201, 206, 209–210, 29; 340/945, 340/947
See application file for complete search history.

(56) References Cited

U.S. PATENT DOCUMENTS

| 4,086,632 | A | * | 4/1978 | Lions | 701/210 |
| 5,398,186 | A1 | | 10/2002 | Price | |
| 6,643,580 | B1 | * | 11/2003 | Naimer et al. | 701/206 |
| 6,963,291 | B2 | * | 11/2005 | Holforty et al. | 340/945 |
| 2002/0140578 | A1 | | 10/2002 | Price | |
| 2003/0060940 | A1 | | 3/2003 | Humbard | |

FOREIGN PATENT DOCUMENTS

JP         05039095        2/1993
WO PCT/US2007/088093   10/2008

* cited by examiner

*Primary Examiner*—Gertrude Arthur Jeanglaud
(74) *Attorney, Agent, or Firm*—Sawyer Law Group PC

(57) ABSTRACT

A routing tool is disclosed. In one embodiment, the method and system include receiving flight data and geographic data in the aircraft, and generating route data based on the flight data and the geographic data. The route data provides information about attainable landing areas for the aircraft.

40 Claims, 9 Drawing Sheets

DETERMINING SUITABLE AREAS FOR OFF-AIRPORT LANDINGS

FIELD OF THE INVENTION

The present invention relates generally to general aviation aircraft, unmanned aircraft and more particularly to a routing tool for use with the aircraft.

BACKGROUND OF THE INVENTION

In-flight emergencies that result in off-airport landings can result in the loss of life and property. The problem of selecting a suitable emergency landing site ("safe landing area") has been around since the beginning of aviation. During in-flight emergencies, pilots have been limited to using their planning, experience, vision and familiarity with a given area to select a suitable, safe landing area.

During a forced landing, the time that a pilot has to react can be very short and compounded by the workload of finding a suitable landing site, executing emergency procedures, preparing the passengers, and flying the aircraft. In any in-flight emergency that requires an off-airport landing, time management and an informed decision making process is critical. This problem is compounded by single pilot operations, Instrument Meteorological Conditions (IMC) conditions, and undetected hazards and obstacles at the landing site.

Aircraft energy management is another pilot dilemma. The information presented to pilots during training is generally conservative and/or worst case conditions. Consequently, pilots currently rely on their training and experience to make emergency landing decisions.

With the advent of global positioning system (GPS) navigation, manufactures have added a "nearest airport" feature to GPS receivers. This feature allows the pilot to display the navigation information to the nearest airport. However, this solution is effective only if the plane can actually make it to the airport.

Accordingly, what is needed is an improved method and system for facilitating emergency situations.

SUMMARY OF THE INVENTION

A method and system for facilitating a landing of an aircraft is disclosed. In one embodiment, the method and system comprise receiving flight data and geographic data in the aircraft, and generating route data based on the flight data and the geographic data. The route data provides information about attainable landing areas for the aircraft.

DETAILED DESCRIPTION

The following description is presented to enable one of ordinary skill in the art to make and use the embodiments, and is provided in the context of a patent application and its requirements. Various modifications to the preferred embodiment and the generic principles and features described herein will be readily apparent to those skilled in the art. Thus, the embodiments are not intended to be limited to the embodiments shown, but is to be accorded the widest scope consistent with the principles and features described herein.

Embodiments determine suitable, safe landing areas and help pilots and unmanned aircraft vehicles (UAV) operators to quickly make decisions in emergency situations. The safe landing areas may include both landing areas at airports and off-airport landing areas. A route analysis and planning tool utilizes a routing algorithm to process information from a combination of geographic data, global positioning system (GPS) data, aircraft-instrumentation data, and performance parameters. The route analysis and planning tool may also display route data to the pilot or UAV operator. The route data provides information about attainable landing areas for the aircraft. Such information may provide not only information about the landing area (e.g., runway length) but may also provide information about the route to the landing area (e.g., mountains, utility poles, wind conditions, etc.). In one embodiment, the information about the route to the landing area may also include information about the descent of the aircraft. For example, as described in more detail below in connection with FIG. 14, embodiments may also take into account horizontal aspects of the approach to the landing area (e.g., altitude). The route data improves flight safety by giving the pilot or UAV operator the ability to pre-plan a safe route, to quickly determine suitable off-airport landing areas in real time, and to determine if there is sufficient energy to make it to the selected off-airport site. As a result, the safety of general aviation and of UAV aircrafts is greatly improved as well as the safety of life and property on the ground. To more particularly describe the features of the embodiments, refer now to the following description in conjunction with the accompanying figures.

Although the embodiments disclosed herein is described in the context of manned planes, the embodiments may apply to the operation of UAV, and still remain within the spirit and scope of the embodiments. For example, embodiments may provide UAV operators with planning tools to ensure a given UAV can divert to a safe recovery zone at any time along its flight path. If implemented on board the UAV, the UAV may automatically take appropriate action in the event of a failure and loss of communication.

Figure 1:
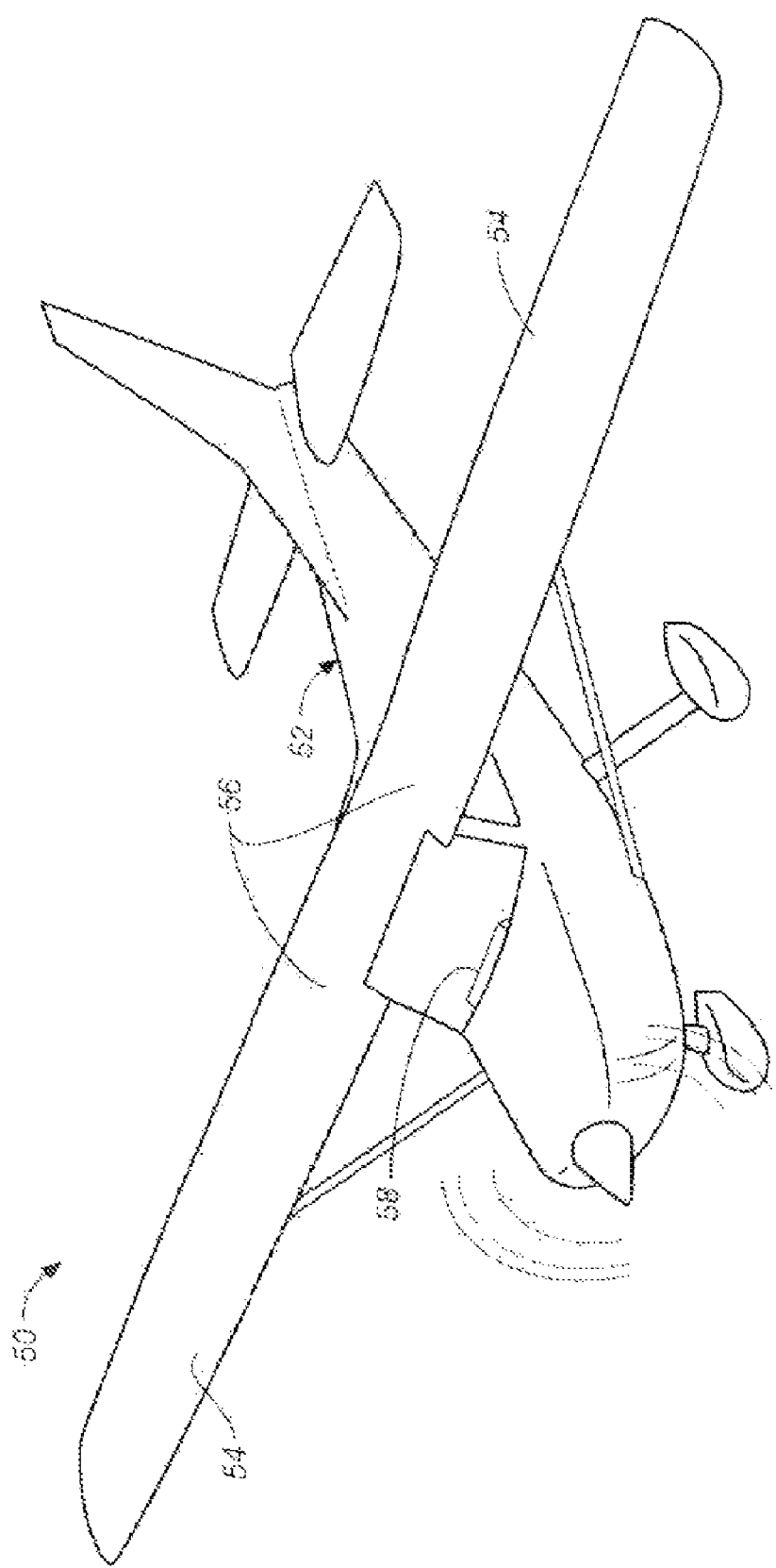
FIG. 1 is a partially schematic isometric view of an aircraft

FIG. 1 is a partially schematic isometric view of an airplane 50 having a fuselage 52 and wings 54. In one embodiment, the airplane may include aircraft systems such as a fuel tank 56, fuel indicating system 58, GPS unit 120 (FIG. 2), real-time weather data 122 (FIG. 2), etc. operably coupled to the aircraft 100.

Figure 2:
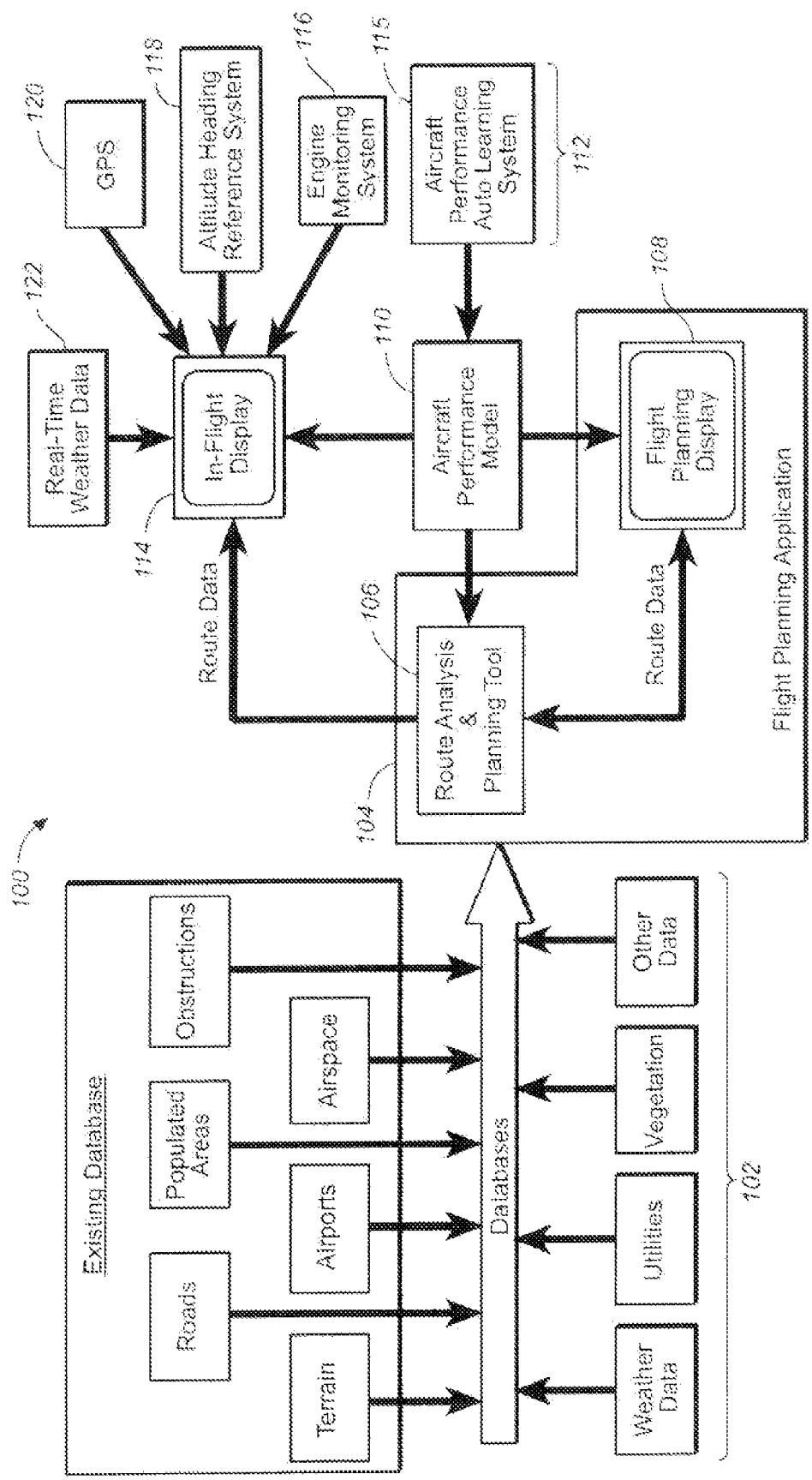
FIG. 2 is a block diagram of a flight planning system and an In-Flight Display in accordance with one embodiment.

FIG. 2 is a block diagram of a flight planning system 100 in accordance with one embodiment. The flight planning system 100 is a computer system that may include databases 102 and a flight planning application 104 that may include a route analysis and planning tool 106 (or "routing tool" 106) and a flight planning display 108, an aircraft-performance model 110, aircraft systems 112, and an in-flight display 114. In one embodiment, the aircraft systems 112 may include an aircraft-performance auto-learning system 115, an engine monitoring system 116, an altitude heading reference system 118, a GPS unit 120, and a real-time weather data system 122. The aircraft systems may provide aircraft state parameters such as airspeed, altitude, aircraft configuration, compass direction, attitude, flaps and gear indications, fuel level, flow, etc.).

In one embodiment, the databases 102 may include geographic information system (GIS) databases. The databases 102 may include a terrain database, a roads database, an airport database, a populated areas database, an airspace database, an obstructions database, a weather data database, a utilities database (e.g., power lines, telecommunication lines, pipe lines, etc.), a vegetation database, and any other appropriate database that stores geographic information (e.g., farms, golf courses, imagery, potential hazards, etc.). The databases 102 provide multiple layers of GIS data to help the pilot during flight planning to select a route that allows for a safe emergency landing at any point on the route. The GIS data from the databases 102 may be overlaid, and safe landing areas may be mapped, color-coded based on aircraft-performance, landing site suitability and pilot preference.

In one embodiment, the routing tool 106 may operate in two different modes: flight-planning mode and in-flight mode. Theses mode are described in more detail below.

Flight-Planning Mode

Figure 3:
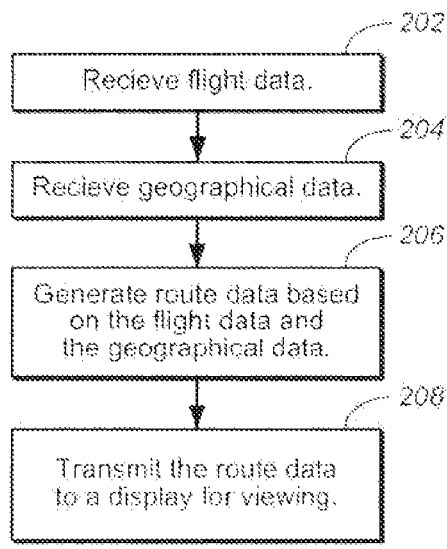
FIG. 3 is a flow chart showing a method for facilitating off-airport landings in accordance with one embodiment.

FIG. 3 is a flow chart showing a method for facilitating off-airport landings in accordance with one embodiment. Referring to both FIGS. 2 and 3 together, the process begins in step 202 where the routing tool 106 may receive flight data from the pilot or UAV operator. In one embodiment, the flight data may include flight-parameter data and aircraft-performance data. The fight-parameter data may include a pilot-selected route and pilot preferences (e.g., type of runway surfaces required, length requirements, etc.). The aircraft-performance data may include: climb performance, cruise performance, descent performance, weight and balance data, fuel capacity and fuel burn rates. Also, the aircraft-performance data may include data for both powered flight and engine-out conditions.

Next, in step 204, the routing tool 106 may receive geographic data from the databases 102. In one embodiment, the routing tool 106 loads current GIS information (e.g., airports, utilities, terrain, hazard information, etc.) from the databases 102. Next, in step 206, the routing tool 106 may generate route data based on the flight data and the geographic data. The route data provides information about attainable landing areas for the aircraft. Such information may provide not only information about the landing area (e.g., runway length) but may also provide information about the route to the landing (e.g., mountains, utility poles, wind conditions, etc.). Also, the landing area may be at an airport or an off-airport landing area.

In one embodiment, route data may include the safest route and altitude. In one embodiment, the routing tool 106 may generate multiple safe routes from which the pilot or UAV operator may select. In one embodiment, the route data may include one or more safe landing areas based on the safest route (or selected route). In one embodiment, a safe landing area may have ample smooth surfaces of sufficient length and free of hazards or obstructions. The route data may also include options for modifying the aircraft path and altitude to ensure a safe landing anywhere along the route. As described in detail below, the route data may then be utilized in-flight along with a real-time moving map and a real-time vertical profile display to facilitate the pilot in an emergency landing. In one embodiment, the route data may include not only safe landing areas but also safe areas generally where there may be little or no population. Accordingly, even if an aircraft such as a UAV were to crash, it would not harm people or structures on the ground. Next, in step 208, the routing tool 106 may transmit the route data to a display for viewing (e.g., to the flight-planning display 108 or to the in-flight display 114). The flight-planning and in-flight displays 108 and 114 depict the aircraft position, safe landing locations, aircraft dead stick (i.e., engine-off) performance envelope (or Safe Options Limit envelope) and velocity vectors, which are described in more detail below.

Figure 4:
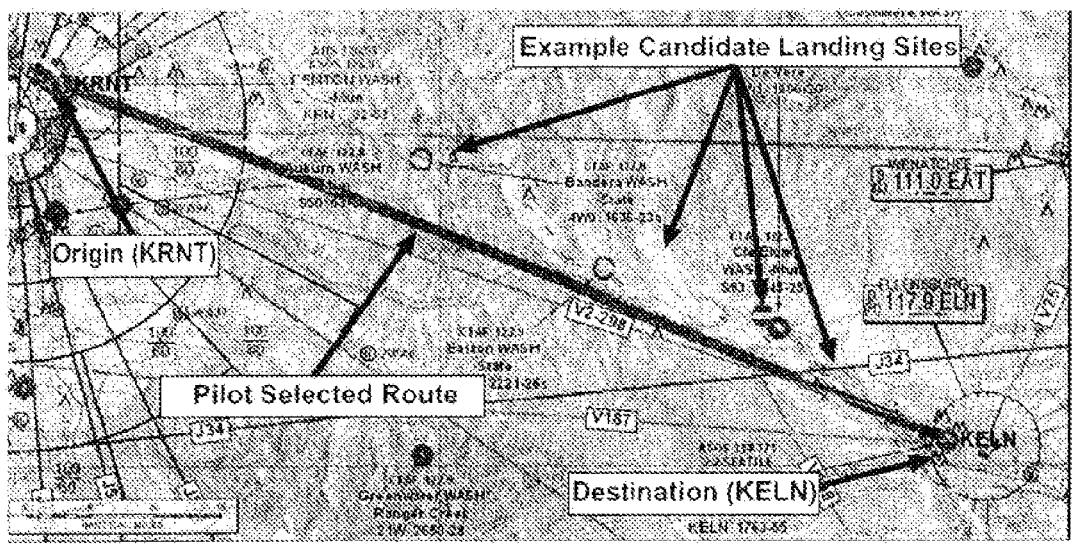
FIG. 4 is an example of a display in an aircraft showing safe landing areas along a route in accordance with one embodiment.

FIG. 4 is an example of a display in an aircraft showing safe landing areas along a route in accordance with one embodiment. FIG. 4 shows a direct route from Renton, Wash. (labeled KRNT) to Ellensburg, Wash. (labeled KELN). In one embodiment, the safe landing areas may be color-coded to reflect an order of preference (e.g., most safe to less safe landing areas).

Figure 5:
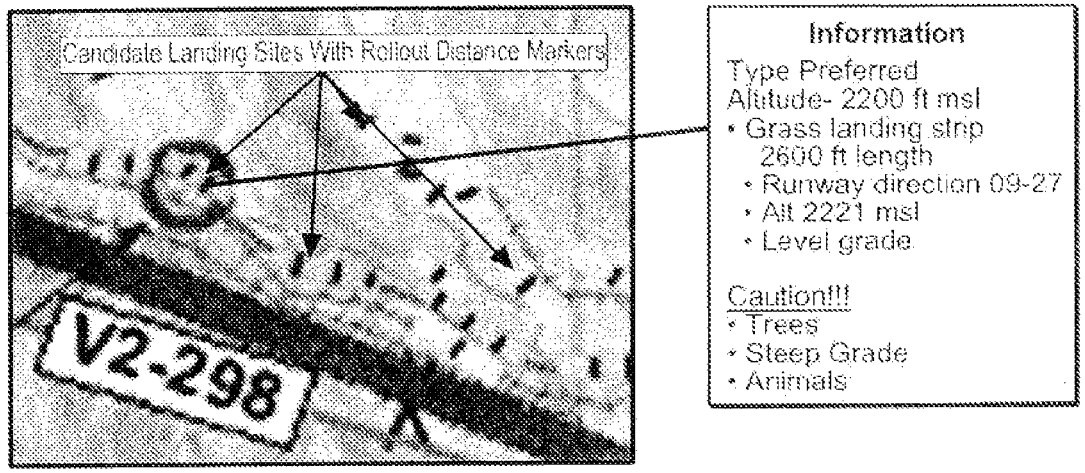
FIG. 5 is an example of a display in an aircraft showing an off-airport landing site in accordance with one embodiment.
Figure 6:
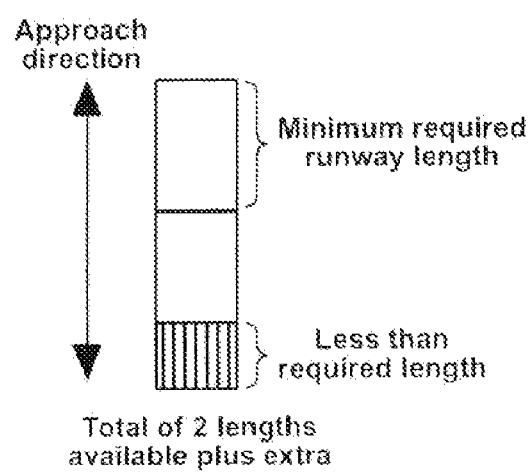
FIG. 6 is an example of a display in an aircraft showing a landing site in more detail.

In one embodiment, when the routing tool 106 determines a given landing area, the routing tool 106 may plot a line that resembles a runway. FIG. 5 is an example of a display in an aircraft showing a runway in accordance with one embodiment. In one embodiment, the runway may be a runway at an airport or an off-airport runway. The routing tool 106 may place rollout distance markers on the runway of each candidate landing area. The rollout distance markers depict the minimum rollout distance for the aircraft. FIG. 6 is an example of a display in an aircraft showing a runway in more detail. These distances may vary based on the runway surface type. This information may give the pilot insight into the approach direction and the length of the landing area. For each landing area, the router creates a lookup table with data that the pilot can access for that particular site. Such details may include length, width, elevation, grade, headings, obstacles, surface type, surface conditions, additional hazards, etc.

Figure 7:
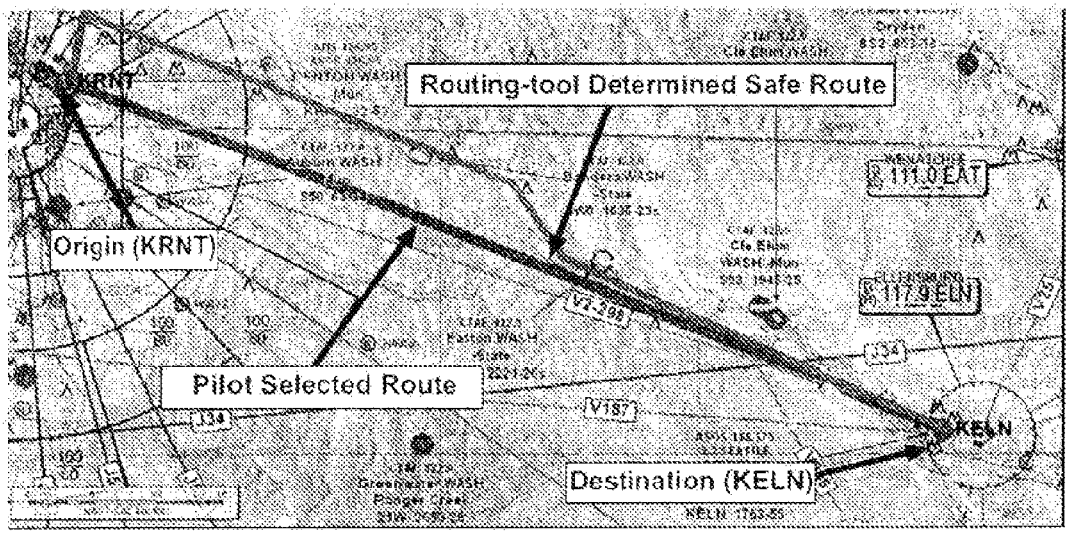
FIG. 7 is an example of a display in an aircraft showing a pilot-selected route and a routing-tool determined safe route.
Figure 8:
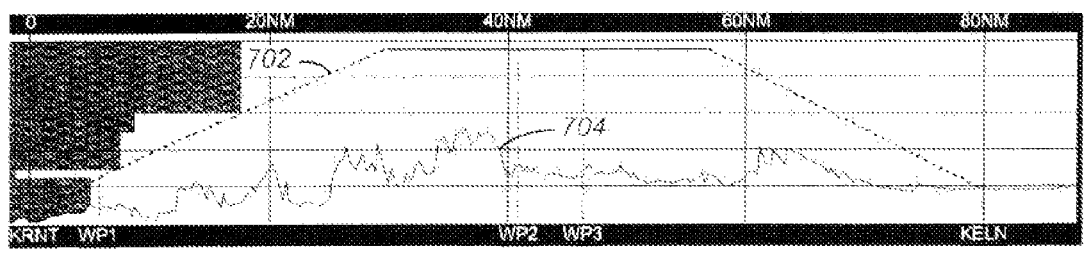
FIG. 8 is an example of a display in an aircraft showing a flight-path vertical profile in accordance with one embodiment.

In one embodiment, the routing tool 106 may then generate a flight path based on the candidate landing areas in order to provide the safest and most efficient route. FIG. 7 is an example of a display in an aircraft showing a pilot-selected route and a routing-tool determined safe route. In one embodiment, the routing tool 106 may also generate a minimum-altitude flight profile that will insure safe gliding distance to a landing site anywhere along the route. FIG. 8 is an example of a display in an aircraft showing a flight-path vertical profile in accordance with one embodiment. FIG. 8 shows a flight route 702 as well as terrain 704.

In-Flight (Real Time) Mode

As indicated above, the route data generated during the flight-planning mode may be utilized in flight to aid the pilot in selecting a safe landing area in the event of an emergency. As described in more detail below, the in-flight display 114 may include a moving map, aircraft present position, Safe Options Limit envelope, and velocity vectors.

In one embodiment, the aircraft systems 112 may provide other information to the in-flight display 114 in real time. As such, in addition to flight data and geographic data, as describe above, the route data may also be based on navigation data such as an inertial navigation system (INS), attitude and heading reference system (AHRS), and GPS data. Navigation data may include, for example, present position, altitude, true course, ground, attitude, true airspeed, wind speed and direction, heading, etc. In one embodiment, the route data may also be based on data provided by the aircraft systems 112. Such data may include, for example, aircraft configuration information (e.g., gear position, flap position, etc.), current weight and balance (adjusted for fuel used), fuel burn rate and quantity, and engine parameters (e.g., rotations per minute (RPM), manifold pressure, prop pitch, etc.).

In one embodiment, the route date may also include all or a combination of Safe Options Limit (SOL) information, velocity vectors, and Vertical Trend Indicators (VTI), which are described in more detail below.

Safe Options Limit Envelope

The Safe Options Limit (SOL) envelope may inform the pilot of his current engine-out glide limits and helps the pilot to quickly eliminate landing locations that cannot be reached. In one embodiment, the glide limits may be based on the position of the aircraft and conditions surrounding the aircraft. As such, the SOL envelope may shows the effects of distance loss due to aircraft turns, aircraft configuration, terrain, wind effects, etc.

Figure 9:
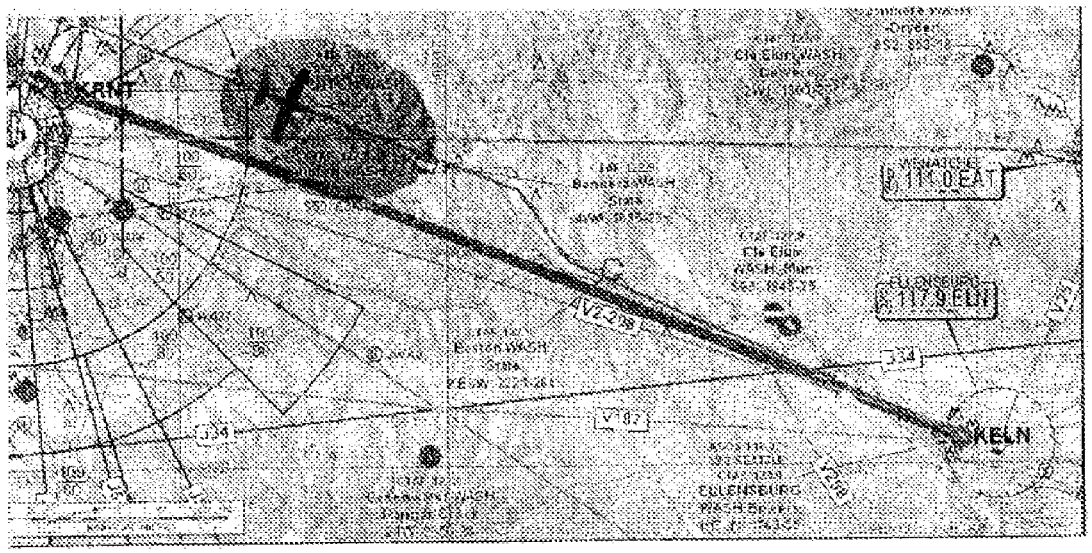
FIG. 9 is an example of a display in an aircraft showing the aircraft inside of a Safe Options Limit (SOL) envelope in accordance with one embodiment.

FIG. 9 is an example of a display in an aircraft showing the aircraft inside of an envelope (shaded area) in accordance with one embodiment. The area inside the envelope depicts landing sites that are available to the pilot based on the real-time position of the aircraft and the real-time conditions surrounding the aircraft. In one embodiment, the envelope may be determined by the aircraft dead stick (engine out situation) performance, which may include the aircraft speed, height above ground, aircraft configuration, attitude, and winds. Accordingly, in a dead stick situation, the SOL envelope may show the pilot the landing sites that are available.

Figure 10:
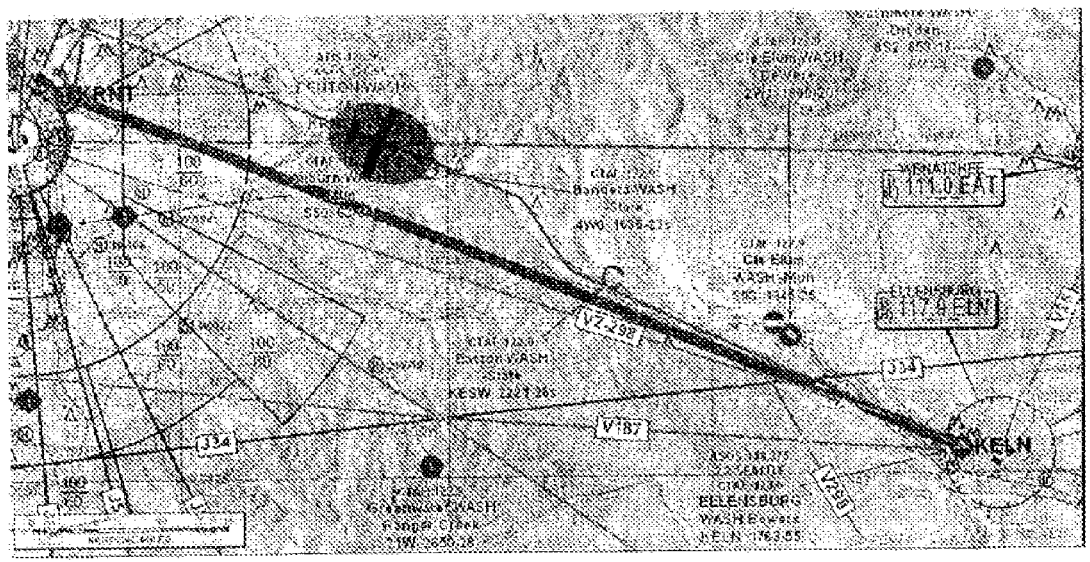
FIG. 10 is an example of a display in an aircraft showing the aircraft inside of a smaller SOL envelope as the aircraft descends, in accordance with one embodiment.
Figure 11:
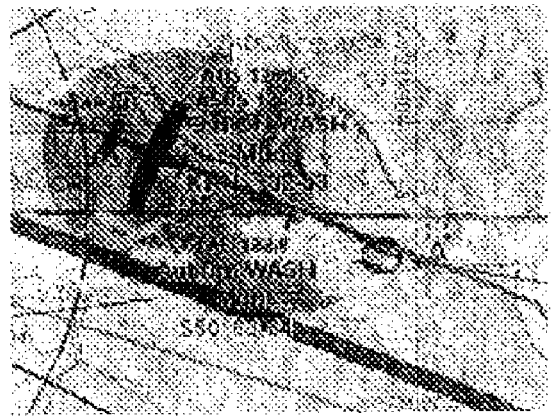
FIG. 11 is an example of a display in an aircraft showing how the SOL envelope shape may be affected by terrain obstructions, in accordance with one embodiment.

In one embodiment, as the aircraft descends, the SOL envelope may grow smaller informing the pilot of the narrowing safe landing area options that are available. While FIG. 9 shows an SOL envelope of particular size, FIG. 10 is an example of a display in an aircraft showing the aircraft inside of a smaller SOL envelope as the aircraft has descended, in accordance with one embodiment. The SOL envelope may be elliptical as shown in FIGS. 9 and 10. However, the actual shape of the SOL envelope may vary depending on the terrain, wind conditions, aircraft-performance, etc. FIG. 11 is an example of a display in an aircraft showing how the SOL envelope shape may be affected by terrain obstructions, in accordance with one embodiment.

Velocity Vectors

A real-time velocity vector may be displayed for both horizontal and vertical profiles (also referred to a vertical trend indicator). The velocity vector may aid the pilot in energy management, obstacle avoidance and turn performance. In one embodiment, a horizontal velocity vector may be projected using the current aircraft attitude, position, ground speed and heading transmitted from an inertial navigation system (INS) or attitude and heading reference system (AHRS). If INS or AHRS data is not available, the heading may be replaced by the true course, and the estimated roll information may be derived from information supplied by a GPS. Using INS or AHRS information may provide better precision and accuracy than using GPS information.

Figure 12:
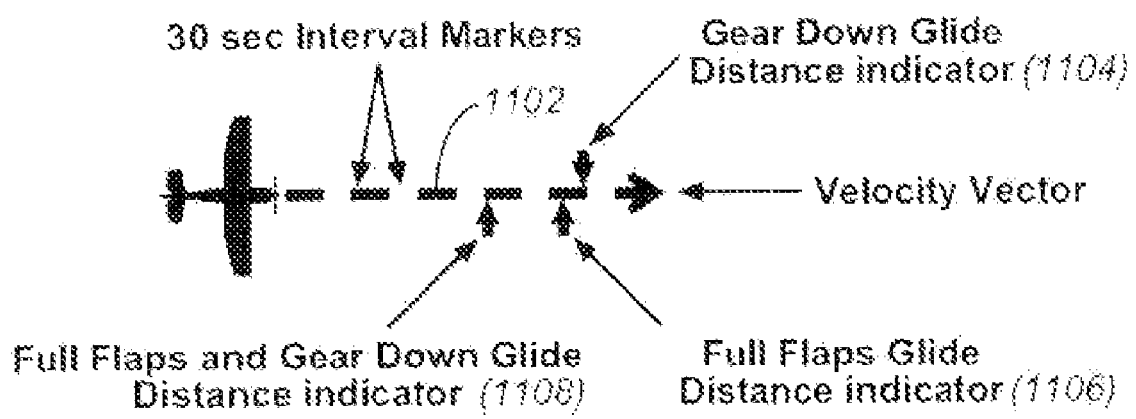
FIG. 12 is an example of a display in an aircraft showing a velocity vector in accordance with one embodiment.

FIG. 12 is an example of a display in an aircraft showing a velocity vector 1102 in accordance with one embodiment. As FIG. 12 shows, the velocity vector 1102 may be divided into marks, each representing a time interval (e.g., 30 seconds) and may be adjusted by the pilot in normal in-flight mode. In one embodiment, there may be several indicators 1104, 1106, and 1108 on the velocity vector that show the effect of a configuration change on the glide distance. These indicators illustrate the effect of putting the aircraft gear down (indicator 1104), full flaps (indicator 1106), and the combination of both (indicator 1108). As FIG. 11 shows, each of the indicators 1104-1108 may indicate on the velocity vector 1102 an end point representing how much the glide may be extended.

Figure 13:
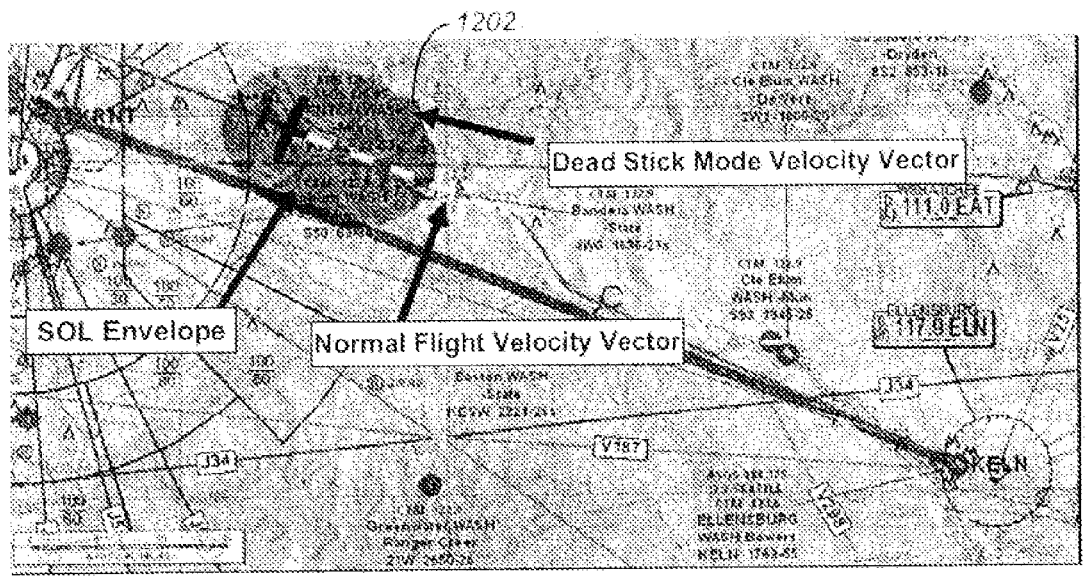
FIG. 13 is an example of a display in an aircraft showing a velocity vector in accordance with another embodiment.

FIG. 13 is an example of a display in an aircraft showing a velocity vector 1202 in accordance with another embodiment. As FIG. 13 shows, when in a dead stick mode, the velocity vector 1202 may change to reflect the dead stick glide distance based on aircraft-performance and terrain elevation where the end point may be positioned.

Vertical Trend Indicator

Figure 14:
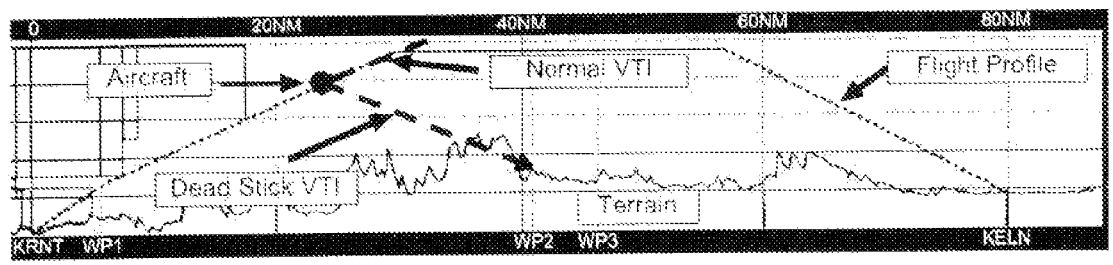
FIG. 14 is an example of a display in an aircraft showing a vertical trend indicator and velocity vector in accordance with one embodiment.

FIG. 14 is an example of a display in an aircraft showing a vertical trend indicator (VTI) in accordance with one embodiment. As FIG. 14 shows, the vertical vector may be projected in a profile display using the current aircraft attitude, position, ground speed, altitude, and vertical speed transmitted from an INS or AHRS. If INS or AHRS data is not available, the vertical speed may be derived from the GPS. In one embodiment, the VTI includes a vertical vector that may assist the pilot in determining terrain or obstacle clearance on route to the landing location. Also, there are several indicators on the VTI that show the effect of a configuration change on the glide distance. For example, one of the dotted lines shows a dead stick VTI, where the arrow at end of the line indicates how far the aircraft can glide based on its current location. The profile also shows mountainous terrain in the glide path. This information enables a pilot to make quick navigation decisions.

Auto-Learning System

Figure 15:
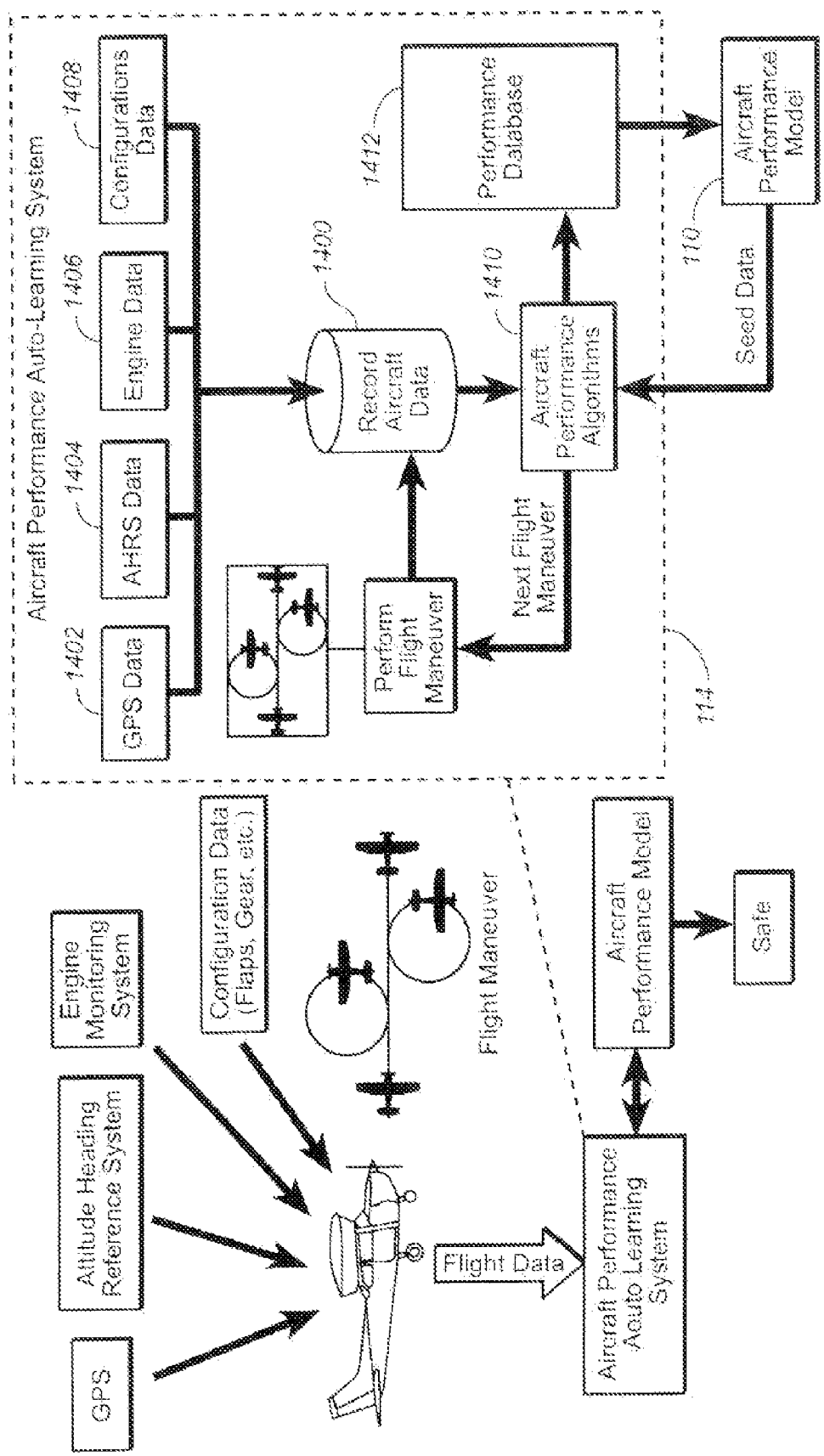
FIG. 15 is a block diagram of the aircraft-performance auto-learning system of FIG. 1 in accordance with one embodiment.

FIG. 15 is a block diagram of the aircraft-performance auto-learning system 114 of FIG. 2, in accordance with one embodiment. The aircraft-performance auto-learning system 114 includes a recorded aircraft database 1400, which may store GPS data 1402, AHRS data 1404, engine data 1406, configuration data 1408, a processor 1410, and a performance database 1412.

In operation, the processor 1410 may utilize aircraft-performance algorithms to generate performance data from flight maneuvers. The auto-learn cycle may start by flying a set of maneuvers, recording 1400, processing the flight data into a performance database 1412 and generating a aircraft performance model 110. The auto-learn cycle may then be repeated for the next maneuver in the set using the performance model data as seed data for the algorithms in the next cycle. Once the initial auto-learn cycle is completed, the system 114 may continue to update the performance database and model using current flight data.

According to the system and method disclosed herein, the embodiments provide numerous benefits. For example, embodiments improve safety of general aviation and UAV aircraft as well as the safety of life and property on the ground.

Embodiments may be readily implemented as the route algorithm may be integrated into existing flight planning software and flight management systems. Embodiments may also be utilized by ground controllers to aid pilots in an emergency, saving time and reducing the workload of a given pilot.

A method and system for facilitating emergency landings have been disclosed. Embodiments determine suitable off-airport landing areas and help pilots and UAV operators to quickly make decisions in emergency situations. The routing tool utilizes a routing algorithm to processes information from a combination of geographic databases, global positioning system (GPS) data, common aircraft instrumentation and data, and performance parameters. The route analysis and planning tool may also display route data to the pilot or UAV operator. The route data provides information about attainable landing areas for the aircraft. Such information may provide not only information about the landing area (e.g., runway length) but may also provide information about the route to the landing (e.g., mountains, utility poles, wind conditions, etc.). The route data improves flight safety by giving the pilot or UAV operator the ability to pre-plan a safe route, to quickly determine suitable off-airport landing areas in real time, and to determine if there is sufficient energy to make it to the selected off-airport site.

One of ordinary skill in the art will readily recognize that there could be variations to the embodiments. For example, embodiments may be implemented using hardware, software, a computer readable medium containing program instructions, or a combination thereof. Software written according to the embodiments is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for facilitating a landing of an aircraft, the method comprising:
   receiving flight data in the aircraft;
   receiving geographic data in the aircraft; and
   generating route data based on the flight data and the geographic data, wherein the route data provides information about attainable landing areas for the aircraft, wherein the attainable landing areas comprise one or more off-airport landing areas, wherein the flight data comprises aircraft-performance data, and wherein the aircraft-performance data comprises one or more of runway surface and length requirements, and type of runway surfaces required.

2. The method of claim 1 wherein the flight data comprises one or more flight parameters.

3. The method of claim 2 wherein the one or more flight parameters comprise one or more of a route and pilot preferences.

4. The method of claim 1 wherein the aircraft-performance data comprises one or more of climb performance, cruise performance, descent performance, weight and balance data, and fuel capacity and burn rates.

5. The method of claim 1 wherein the geographic data is provided by one or more of a terrain database, a roads database, an airport database, a populated areas database, an airspace database, an obstructions database, a weather data database, a utilities database, and a vegetation database.

6. The method of claim 1 wherein the route data is further based on navigation data.

7. The method of claim 6 wherein the navigation data comprises one or more of inertial navigation system data, attitude and heading reference system data, and global positioning system data.

8. The method of claim 1 wherein the route data is further based on aircraft system data.

9. The method of claim 8 wherein the aircraft system data comprises one or more of aircraft configuration information, current weight and balance, fuel burn rate and quantity, and engine parameters.

10. The method of claim 1 wherein the route data further comprises glide limits.

11. The method of claim 10 wherein the glide limits are based on one or more of a real-time position of the aircraft and real-time conditions surrounding the aircraft.

12. The method of claim 1 wherein the route data further comprises a velocity vector, wherein the velocity vector is based on one or more of a current aircraft attitude, position, ground speed, and heading.

13. The method of claim 1 wherein the route data further comprises a vertical vector, wherein the vertical vector is based on one or more of a current aircraft attitude, position, ground speed, altitude, and vertical speed.

14. A computer-readable medium containing program instructions for facilitating a landing of an aircraft, which when executed by a computer system cause the computer system to execute a method comprising:
   receiving flight data in the aircraft;
   receiving geographic data in the aircraft; and
   generating route data based on the flight data and the geographic data, wherein the route data provides information about attainable landing areas for the aircraft, wherein the attainable landing areas comprise one or more off-airport landing areas, wherein the flight data comprises aircraft-performance data, and wherein the aircraft-performance data comprises one or more of runway surface and length requirements, and type of runway surfaces required.

15. The computer-readable medium of claim 14 wherein the flight data comprises one or more flight parameters.

16. The computer-readable medium of claim 15 wherein the one or more flight parameters comprise one or more of a route and pilot preferences.

17. The computer-readable medium of claim 14 wherein the aircraft-performance data comprises one or more of climb performance, cruise performance, descent performance, weight and balance data, and fuel capacity and burn rates.

18. The computer-readable medium of claim 14 wherein the geographic data is provided by one or more of a terrain database, a roads database, an airport database, a populated areas database, an airspace database, an obstructions database, a weather data database, a utilities database, and a vegetation database.

19. The computer-readable medium of claim 14 wherein the route data is further based on navigation data.

20. The computer-readable medium of claim 19 wherein the navigation data comprises one or more of inertial navigation system data, attitude and heading reference system data, and global positioning system data.

21. The computer-readable medium of claim 14 wherein the route data is further based on aircraft system data.

22. The computer-readable medium of claim 21 wherein the aircraft system data comprises one or more of aircraft configuration information, current weight and balance, fuel burn rate and quantity, and engine parameters.

23. The computer-readable medium of claim 14 wherein the route data further comprises glide limits.

24. The computer-readable medium of claim 14 wherein the glide limits are based on one or more of a real-time position of the aircraft and real-time conditions surrounding the aircraft.

25. The computer-readable medium of claim 24 wherein the route data further comprises a velocity vector, wherein the velocity vector is based on one or more of a current aircraft attitude, position, ground speed, and heading.

26. The computer-readable medium of claim 14 wherein the route data further comprises a vertical vector, wherein the vertical vector is based on one or more of a current aircraft attitude, position, ground speed, altitude, and vertical speed.

27. An airplane comprising:
a plurality of aircraft systems; and
a flight planning system coupled to the plurality of aircraft systems, wherein the flight planning system is operable to receive flight data in the airplane, receive geographic data in the airplane, and generate route data based on the flight data and the geographic data, wherein the route data provides information about attainable landing areas for the airplane, wherein the attainable landing areas comprise one or more off-airport landing areas, wherein the flight data comprises aircraft-performance data, and wherein the aircraft-performance data comprises one or more of runway surface and length requirements, and type of runway surfaces required.

28. The airplane of claim 27 wherein the flight data comprises one or more flight parameters.

29. The airplane of claim 28 wherein the one or more flight parameters comprise one or more of a route and pilot preferences.

30. The airplane of claim 27 wherein the aircraft-performance data comprises one or more of climb performance, cruise performance, descent performance, weight and balance data, and fuel capacity and burn rates.

31. The airplane of claim 27 wherein the geographic data is provided by one or more of a terrain database, a roads database, an airport database, a populated areas database, an airspace database, an obstructions database, a weather data database, a utilities database, and a vegetation database.

32. The airplane of claim 27 wherein the route data is further based on navigation data.

33. The airplane of claim 32 wherein the navigation data comprises one or more of inertial navigation system data, attitude and heading reference system data, and global positioning system data.

34. The airplane of claim 27 wherein the route data is further based on aircraft system data.

35. The airplane of claim 34 wherein the aircraft system data comprises one or more of aircraft configuration information, current weight and balance, fuel burn rate and quantity, and engine parameters.

36. The airplane of claim 27 wherein the route data further comprises glide limits.

37. The airplane of claim 36 wherein the glide limits are based on one or more of a real-time position of the aircraft and real-time conditions surrounding the aircraft.

38. The airplane of claim 27 wherein the route data further comprises a velocity vector, wherein the velocity vector is based on one or more of a current aircraft attitude, position, ground speed, and heading.

39. The airplane of claim 27 wherein the route data further comprises a vertical vector, wherein the vertical vector is based on one or more of a current aircraft attitude, position, ground speed, altitude, and vertical speed.

40. A method for facilitating a landing of an aircraft, the method comprising:
receiving flight data in the aircraft;
receiving geographic data in the aircraft; and
generating route data based on the flight data and the geographic data, wherein the route data provides information about attainable landing areas for the aircraft, and wherein the attainable landing areas comprise one or more off-airport landing areas, wherein the flight data comprises aircraft-performance data, wherein the aircraft-performance data comprises one or more of climb performance, cruise performance, descent performance, weight and balance data, fuel capacity and burn rates, runway surface and length requirements, and type of runway surfaces required, and wherein the geographic data is provided by one or more of a terrain database, a roads database, an airport database, a populated areas database, an airspace database, an obstructions database, a weather data database, a utilities database, and a vegetation database.

* * * * *